United States Patent
Marrecau et al.

(10) Patent No.: US 6,991,672 B2
(45) Date of Patent: Jan. 31, 2006

(54) FILTER ELEMENT COMPRISING PLEATED METAL FIBER FLEECE

(75) Inventors: Willy Marrecau, Rome, GA (US); Koen Wastijn, Deerlijk (BE); Geert Devooght, Koekelare (BE)

(73) Assignee: N.V. Behaert S.A., Zwevegem (BE)

( * ) Notice: Subject to any disclaimer, the term of this patent is extended or adjusted under 35 U.S.C. 154(b) by 209 days.

(21) Appl. No.: 10/466,551

(22) PCT Filed: Jan. 31, 2002

(86) PCT No.: PCT/EP02/01159

§ 371 (c)(1),
(2), (4) Date: Sep. 4, 2003

(87) PCT Pub. No.: WO02/063147

PCT Pub. Date: Aug. 15, 2002

(65) Prior Publication Data

US 2004/0050022 A1   Mar. 18, 2004

Related U.S. Application Data

(60) Provisional application No. 60/265,907, filed on Feb. 5, 2001.

(51) Int. Cl.
   *B01D 46/00* (2006.01)
(52) U.S. Cl. .................. 95/273; 95/278; 55/282.3; 55/385.3; 55/482; 55/483; 55/484; 55/502; 55/510; 55/521; 55/523; 55/527; 55/DIG. 10; 55/DIG. 30; 60/311; 210/493.2; 210/493.5; 210/494.2

(58) Field of Classification Search ............... 55/282.2, 55/282.3, 385.3, 482, 483, 484, 486, 487, 55/510, 521, 523, 524, 525, 527, 502, DIG. 5, 55/DIG. 10, DIG. 30; 60/311; 210/483, 210/493.1, 493.2, 493.5, 494.2, 496; 95/273, 95/278

See application file for complete search history.

(56) References Cited

U.S. PATENT DOCUMENTS

| 3,857,688 A | * | 12/1974 | Wisnewski | .................. 55/502 |
| 4,199,387 A | | 4/1980 | Hladik | |
| 4,687,579 A | | 8/1987 | Bergman | |

(Continued)

FOREIGN PATENT DOCUMENTS

WO    WO 97/04152 A1    2/1997

(Continued)

*Primary Examiner*—Jason M. Greene
(74) *Attorney, Agent, or Firm*—Foley & Lardner LLP (57) ABSTRACT

A filter element comprising a pleated metal fiber fleece is pleated according to pleating lines, providing an edge with pleat openings to be closed to make gas flowing through the metal fiber fleece. The filter element comprising at least two flanks, each of these flanks comprises a thermally and electrically insulating fabric and a stiff material layer. The thermally and electrically insulating fabric is present at one side of the stiff material layer, providing a thermally and electrically insulated side to the flank. The metal fiber fleece is mounted between the thermally and electrically insulated sides of both flanks, which exercise a clamping force on the edges of the metal fiber fleece in a direction essentially parallel to the pleating lines, while the flanks closing said pleat openings.

11 Claims, 5 Drawing Sheets

U.S. PATENT DOCUMENTS

| | | | |
|---|---|---|---|
| 5,395,039 A * | 3/1995 | Koehler et al. | 210/496 |
| 5,405,422 A * | 4/1995 | Ueda et al. | 55/282.3 |
| 5,709,722 A | 1/1998 | Nagai et al. | |
| 5,733,452 A * | 3/1998 | Whitlock | 55/510 |
| 5,800,790 A | 9/1998 | Imamura et al. | |
| 6,096,212 A * | 8/2000 | Quick et al. | 210/496 |
| 6,572,682 B2 * | 6/2003 | Peter et al. | 55/282.2 |
| 2003/0196419 A1 * | 10/2003 | Peter et al. | 55/282.3 |
| 2004/0040268 A1 | 3/2004 | Wastijn et al. | |
| 2004/0050023 A1 | 3/2004 | Wastijn et al. | |
| 2004/0131511 A1 | 7/2004 | Marrecau et al. | |

FOREIGN PATENT DOCUMENTS

| | | | |
|---|---|---|---|
| WO | WO 00/00721 | * | 1/2000 |
| WO | WO 01/00971 A1 | | 1/2001 |

* cited by examiner

FILTER ELEMENT COMPRISING PLEATED METAL FIBER FLEECE

FIELD OF THE INVENTION

The present invention relates to filter elements, which may be regenerated electrically. More specific, the invention relates to filter elements for filtering diesel exhaust gasses.

BACKGROUND OF THE INVENTION

Diesel soot particulate traps comprising pleated metal fiber fleece are known, e.g. from U.S. Pat. No. 5,709,722.

Diesel soot particulate traps, which can be regenerated via electrical heating of the filter element itself, are known, e.g. from U.S. Pat. No. 5,800,790.

The presently known filter elements, suitable for electrical regeneration, have the disadvantage that most of the thermal energy, obtained by Joule effects out of electrical energy and used to heat the filter element, is lost due to thermal losses.

SUMMARY OF THE INVENTION

It was found that the losses of thermal energy is caused by 3 effects:
1. The filter medium, generating the thermal energy via Joule effects, looses thermal energy via radiation, e.g. towards the filter housing.
2. Thermal energy is lost via convection, heating the gasses which pas through the filter medium during regeneration. This effect is much larger when the strip is regenerated in stream.
3. Thermal energy is lost due to thermal conduction. E.g. when the filter medium is welded to the housing, a lot of thermal energy is transferred from the filter medium to the housing via this contact. The housing is needlessly heated by this thermal energy conducting.

It is an object of the invention to provide a filter element, to be regenerated electrically, which has a reduced thermal energy loss.

It is also an object of the invention to provide a filter unit, comprising at least two bur possibly more than two filter elements, each filter element being regeneratable individually. Such a filter unit as subject of the invention may be used in a diesel exhaust filter pack for stationary diesel engines of for diesel engines, used in vehicles such as boats, trains or other motor vehicle.

Filter pack is to be understood as a filter system which is installed or used in a gas stream. It comprises a gas inlet, a gas outlet, and at least one filter unit, installed between inlet and outlet.

A filter element as subject of the invention comprises a pleated metal fiber fleece. This metal fiber fleece, preferably sintered, is pleated according to pleating lines, so providing an edge with pleat openings. The gas, to be filtered, has to flow from one side of the fleece (inflow side) to the other side of the fleece (outflow side), passing through the fleece. Appropriate pleat openings have to be closed in order to make the gas to flow through the metal fiber fleece, so preventing bypasses from gas from the inflow side to the outflow side, without passing through the metal fiber fleece.

A filter element according to the invention further comprises a filter element housing, which comprises at least two flanks. According to the present invention, at least one side of each flank is provided out of thermally and electrically insulating material, so providing a thermally and electrically insulated side to the flank.

According to the invention, the edge of the pleated metal fiber fleece is mounted between the two thermally and electrically insulating sides of the flanks in such a way that the edge makes contact with these thermal and electrically insulating sides of the flanks.

Each of these flanks comprising a thermally and electrically insulating fabric and a stiff material layer. The thermally and electrically insulating fabric is present at one side of the stiff material layer, so providing a thermally and electrically insulated side to the flank. The metal fiber fleece is mounted between the thermally and electrically insulated sides of both flanks, which exercise a clamping force on the edges of the metal fiber fleece in a direction essentially parallel to the pleating lines, meanwhile closing the pleat openings in order to prevent bypasses.

According to the present invention, for each flank, a thermally and electrically insulating fabric, e.g. a ceramic textile layer, is supported by a stiff material layer, preferably a metal or ceramic plate or rim. The metal fiber fleece is mounted between the thermally and electrically insulated sides of both flanks, in such a way that these sides of the flanks close the pleating openings. Since the thermally and electrically insulating fabric provides the thermally and electrically insulated side, the thermally and electrically insulating fabrics make contact with the edge of the metal fiber fleece. A clamping force is exercised by the flanks on the edges of the metal fiber fleece in a direction essentially parallel to the pleating lines. Since the pleated metal fiber fleece has sufficient buckling resistance, the pleated metal fiber fleece is pressed into the thermally and electrically insulating fabric, so providing a recess over the edge of the pleated metal fiber fleece in the thermally and electrically insulating fabrics of the flanks.

The depth of the recess of the edge should at least be sufficient to prevent the pleated metal fiber fleece to move along with the gas to be filtered. This phenomenon is so called 'blow through'. The recess, being the depth over which the metal fiber fleece is presses in the thermally and electrically insulating fabric, is preferably larger than 0.5 mm, but may be in the range of 0.5 mm to 2 mm.

In the scope of the present invention, a thermally and electrically insulating fabric is to be understood as a nonwoven, woven, braided or knitted textile fabric, comprise thermally and electrically insulating fibers at the surface of the fabric, which is to contact the edge of the metal fiber fleece. Most preferably, the whole fabric consist of such thermally and electrically insulating fibers, however, a combination of thermally and electrically insulating fibers at the side contacting the edge, with metal fibers at the opposite side may be used. Such thermally and electrically insulating fibers preferably are ceramic fibers, such as fibers, comprising $Al_2O_3$ and/or $SiO_2$, e.g. NEXTEL®-fibers.

The fabric thickness is preferably between 3 to 6 mm. A woven or nonwoven fabric is preferred.

When according to the invention, flanks comprising ceramic plates or rims are used to provide a filter element as subject of the invention, the ceramic plates or rims are obtainable by using ceramic materials, e.g. based on $Al_2O_3$ and or $SiO_2$ or mica to provide this side of the flank. When, also according to the present invention, flanks comprising metal plates or rims, preferably stainless steel is used to provide the metal plates or rims. The flank may be provided out of one material, or may comprise different layers, provided by different materials. In general, and also according to the present invention, "stiff material" is to be understood as an inflexible material, which to a certain extend lacks suppleness or pliability and being having the property of being difficult to bend, as is generally known for ceramic or metal plates.

Filter elements as subject of the invention may further comprise other elements, to form, together with the flanks mentioned above, the filter element housing. These elements may also be thermally and electrically insulated, in order to reduce the thermal energy, lost due to radiation, from the metal fiber fleece to these elements or due to the heating of these elements because of contact between hot gas and housing. E.g. a perforated metal screen or a more permeable thermally insulating fabric may be applied, in order to further reduce the thermal losses due to radiation towards the adjacent filter units of the filter pack wall. In case of a more permeable thermally insulating fabric, preferably, a $SiO_2$-grid woven fabric is used.

According to the invention, the thermally and electrically insulating side of the flanks closes the pleat openings, which are to be closed in order to prevent bypasses from gas to be filtered. These sides fix the metal fiber fleece in its position.

Such filter elements as subject of the invention have several advantages.

The thermal energy loss due to conduction is prevented, since the sides of the flanks, used to close the pleat openings have thermally insulating properties. The metal fiber fleece Is only In contact with the filter housing via this side. The pleating of the metal fiber fleece also causes thermal radiation, being radiated from one pleat to the adjacent pleats.

Since electrical current is to be supplied only to the metal fiber fleece, in order to regenerate the fleece, the fleece is electrically insulated from the filter housing at its edge, by the electrically insulating side.

Preferably, the metal fiber fleece is to be resistant to bulging. A sintered and pleated metal fiber fleece has a rather high bulging resistance due to the pleated shape, to provide an edge.

Further, surprisingly it was found that, when a filter element as subject of the invention comprising a thermally and electrically insulating fabric is used, e.g. to filter diesel exhaust gas, loaded with soot particles, the filter element works self-sealing, even after regenerating. This is explained as follows.

The edge of the metal fiber fleece is mounted or pressed between the thermally and electrically insulating sides of the flanks.

In case a thermally and electrically insulating fabric is used, due to the textile nature of the fabric, the metal fiber fleece is recessed to a certain depth in the fabric. Under normal circumstances, this recess is sufficient to close all voids in the fabric next to the recessed part of the metal fiber fleece, so no gas can bypass the metal fiber fleece through the thermal and electrical insulating fabric. In case there is a small void in the fabric, which is not closed by the recessed part of the metal fiber fleece, small amounts of exhaust gas will bypass the metal fiber fleece via this void. The soot, being present in the exhaust gas, will be trapped by the fabric, so closing the void space. When the metal fiber fleece is now regenerated, the thermal and electrical insulating fabric will not be heated enough in order to Incinerate the soot, trapped by the fabric at the void space. So the bypass of gas through the fabric is hindered after the void spaces are filled with soot, due to such bypass. The filter seals itself.

In the scope of the present invention, with metal fiber fleece is meant a fleece, comprising metal fibers, preferably steel fibers. The alloy of metal or steel may be chosen dependant on the temperature range which is to be withstand by the metal fiber fleece. Stainless steel fibers of AISI alloys of the 300- or 400 series, or alloys such as Inconel® are to be preferred. In case high temperatures are to be withstand during regeneration, alloys comprising Fe, Al and Cr are preferred, such as Fecralloy®. The fibers may be obtained by any presently known production method, such as bundle drawing or shaving. Fiber diameters between 1 and 100 $\mu$m are to be used, preferably between 2 and 50 $\mu$m, e.g. between 12 and 35 $\mu$m such as 12, 17 and 22 $\mu$m. preferably the fleece is sintered using appropriate sintering circumstances, according to the alloy used. Preferably, the metal fibers are obtainable by bundle drawing or coil shaving. The latter is described more in detail in WO97/04152.

Also thickness, weight per $m^2$, pore diameter and other fleece parameters may be chosen, according to the particles which are to be retained and/or the application for which the filter element is to be used.

Preferably, the metal fiber fleece used to provide the filter elements as subject of the invention, comprises different layers of metal fibers. Each fiber layer comprises fibers with a certain equivalent diameter. Best filtering results were obtained when a layer with the coarsest fibers is facing the inflow side of the filter element, whereas a layer of metal fibers with the finest fibers is facing the out-flow side of the filter. An example of such layered metal fiber fleece is a metal fiber fleece comprising a layer of metal fibers with equivalent diameter of 35 $\mu$m, and a layer of metal fibers with an equivalent diameter of 17 $\mu$m. Possibly a layer of metal fibers with equivalent diameter of 22 $\mu$m can be located between these two layers. Porosity of more than 85% is preferred, while the weight per square meter of the fleece is preferably less than 1500 $g/m^2$, e.g. 1450 $g/m^2$.

Equivalent diameter is to be understood as the diameter of a radial cut of an imaginary round fiber, having an identical surface as the radial cut of the fiber under consideration.

According to the present invention, preferably the metal fiber fleece consists of only one strip of filter media comprising metal fibers. Most preferably, this strip is rectangular. However alternatively, the metal fiber fleece may consist of more than one strip of filter media comprising metal fibers which strips are mounted between the two flanks of the filter element as subject of the invention.

Sintered metal fiber fleece has a good resistance against buckling, when put under mechanical load in a direction, parallel to the plane surface of the fleece. To improve the buckling resistance, the fleece may be corrugated using preferably repetitive undulations, with a wavelength preferably less than 5 times the thickness of the fleece. The amplitude of the corrugation is also preferably less than 5 times the thickness of the fleece. The buckling resistance may be improved more than 50% in ambient circumstances. Then the fleece is heated to more than 600° C., the buckling improvement is still more than 30%.

The metal fiber fleece, used to provide a filter element as subject of the invention further comprise at least two, but possibly more than two contact bodies, fixed, e.g. clamped on or sintered, to the metal fiber fleece. According to the present invention, a contact body is a body to which the electric current Is supplied by the electric circuit, in order to regenerate the filter element. This contact body divides in a proper way the electric current over the total surface of the metal fiber fleece. Preferably, these contact bodies are metal foils, e.g. Ni-foil or metal woven meshes, sintered at both ends of the metal fiber fleece.

Special care is to be taken in case the metal fiber fleece is pleated in such a way that both ends of the metal fiber fleece, each of them to be contacting one pole of the electric circuit, are located close to each other. Both contact bodies are to be insulated from each other. This can be done by inserting one or more electrically insulating plates between both contact bodies, e.g. mica plates. Both contact bodies may be connected to this electrically insulating plate using bolts and nuts or alike. Preferably, the contact bodies are applied on the ends in such a way that the contact bodies extend from the metal fiber fleece in the off-stream direction of the filter element.

Filter elements as subjects of the invention are used to provide filter units. Several filter elements may be combined, e.g. stacked one on top of the other. To avoid thermal losses, the different filter elements are separated from each other by a thermally insulating layer, e.g. a thermally insulating and thermal resistant layer of textile, e.g. a woven $SiO_2$-fabric Filter elements as subject of the invention may be used to filter hot gases, such an exhaust gases from diesel internal combustion engines. Several filter elements or filter units comprising filter elements as subject of the invention may be used in parallel, e.g. to be able to regenerate at least one filter element, through which no gas flows, so reducing convection heat losses, while the other filter elements continue to filter the gas stream. They may be mounted in series connection, to filter the gas stream in different steps, e.g. for different particle sizes.

Each filter element can be regenerated individually, preferably one after the other. The filter element may be regenerated inline, while gas continues to flow through the filter element, or off-line, while gas is partially or fully prevented to flow through the filter element.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
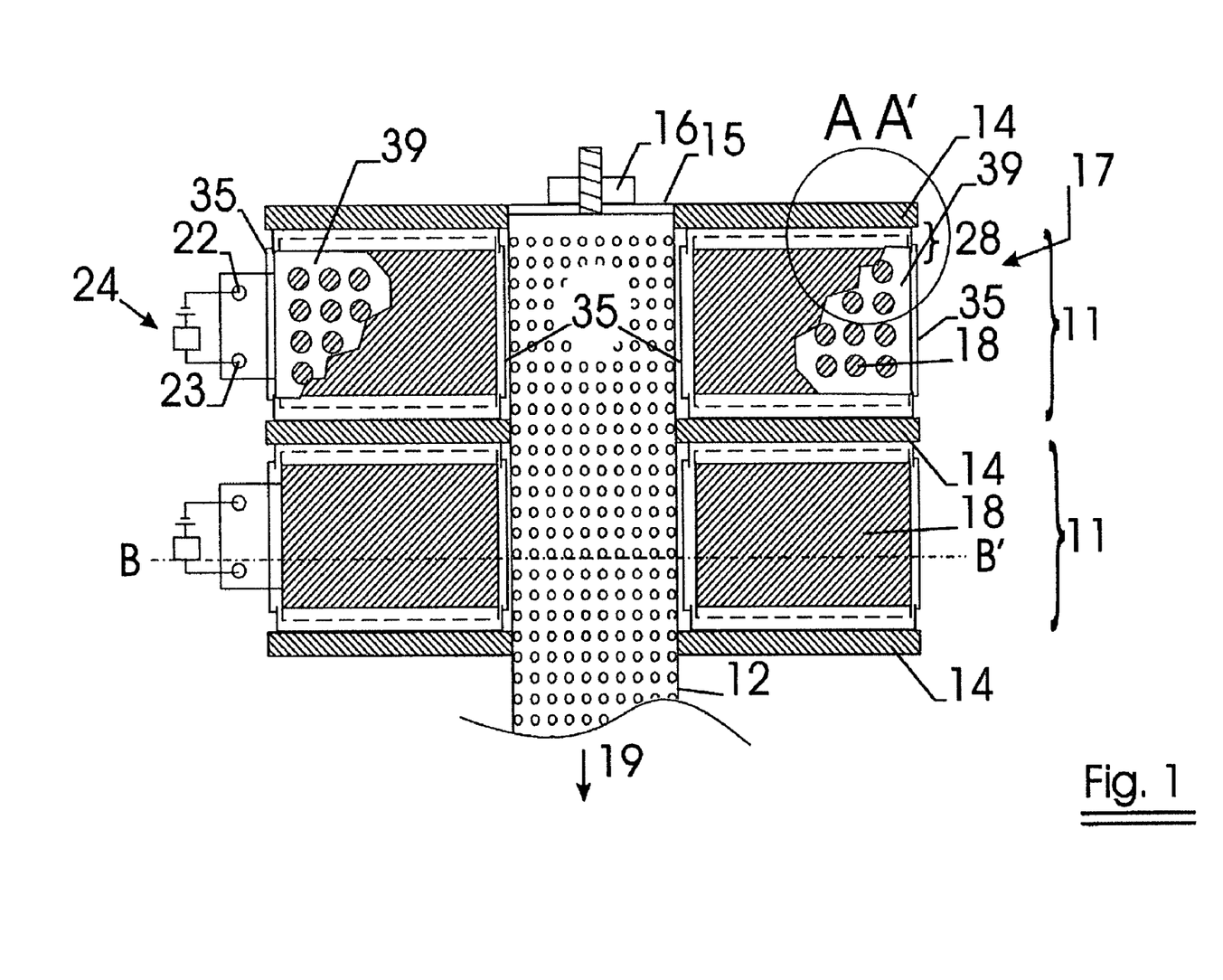
FIG. 1 shows schematically a general view of a filter unit as subject of the invention
Figure 2:
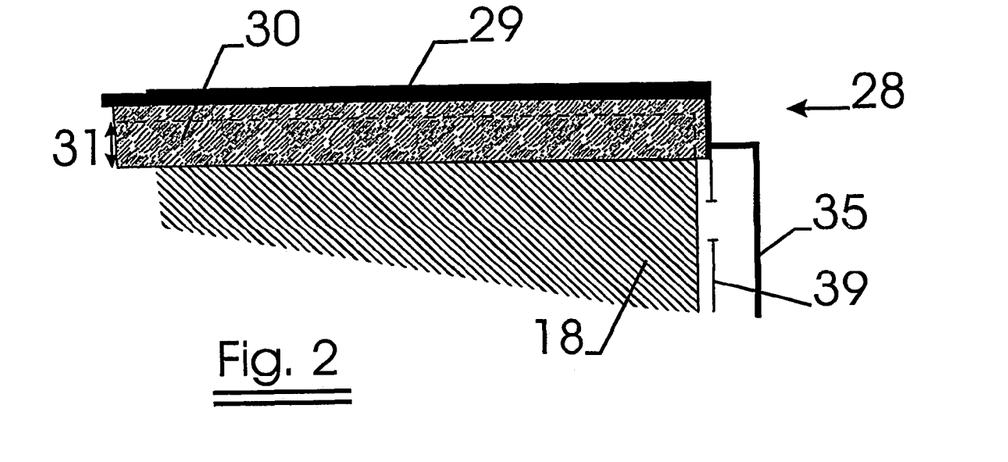
FIG. 2 is schematically an enlarged view of part AA' of the filter unit of FIG. 1.
Figure 3:
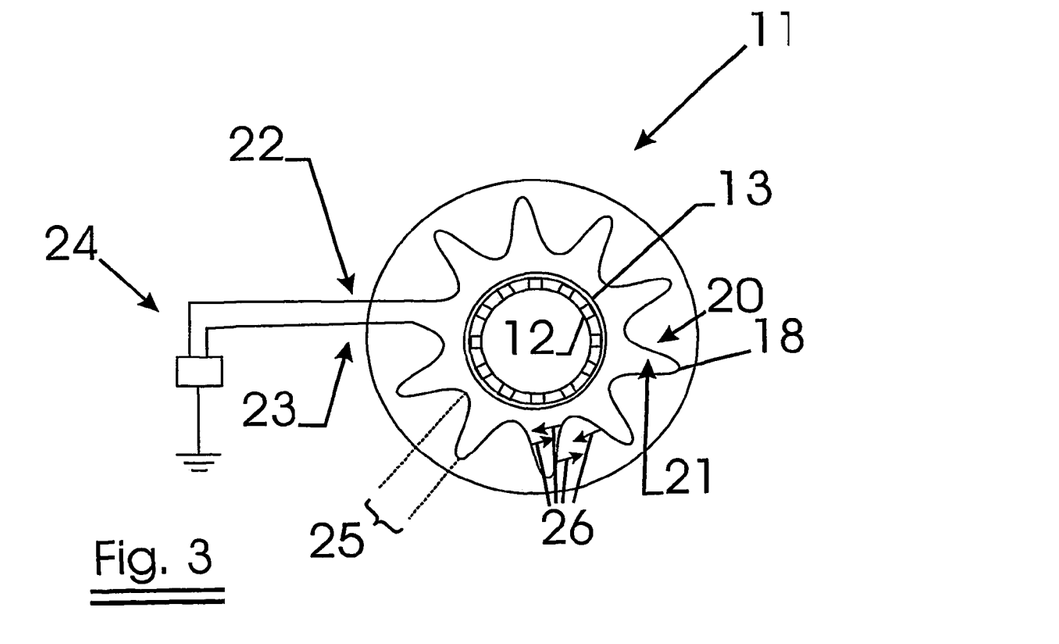
FIG. 3 shows schematically a section according to the plane BB' of the filter unit of FIG. 1.

A preferred filter unit as subject of the invention is shown in FIGS. 1, 2 and 3.

The filter unit comprises a number of filter elements 11, which are stacked one on top of the other. They all have a ring-like shape. A perforated metal tube 12 is positioned inside the inner opening 13 of the filter element. Between each filter element, a disc-like $SiO_2$ felt material 14 is positioned to thermally insulate the different filter elements from each other. At both ends of the filter unit, a metal plate 15 is fixed against the upper and lower filter element e.g. as shown in FIG. 1 by means of a screw 16, which pushes the plate towards the filter element. Between this plate 15 and the upper or lower filter element, another disc-like $SiO_2$ felt material 14 is positioned.

When this filter unit is used, preferably the gas to be filtered flows in from the outer side of the filter elements (indicated with arrow 17), through the filter medium 18 through the perforations of the metal tube 12, to the further exhaust system as indicated with arrow 19.

Taking each filter element of the present embodiment into consideration, a metal fiber fleece is used as filter medium 18. The 'dirty' gas flows in via the inflow side 20, through the metal fiber fleece, via the outflow side 21 of the metal fiber fleece to the exhaust system. The metal fiber fleece is connected via two contact bodies 22 and 23 to an electric circuit 24, providing electrical current to the metal fiber fleece in order to regenerate the dirt, e.g. soot, trapped in and on the filter medium. The metal fiber fleece is preferably pleated in such a way that the thermal radiation heat, generated by the pleats 25 during regeneration, radiates to the adjacent pleats, as indicated by arrows 26. An important reduction of electrical power is obtained using this radiation heat to propagate and support the combustion of the filtered particles The set-up of a preferred embodiment of the filter element is shown in FIG. 2. A flank 28 of the filter element comprises a stiff material layer 29, being a metal rim, in which an electrically and thermally insulating fabric 30 is located. This fabric 30 preferably is a $SiO_2$-feltlike material (e.g. non-woven), having a thickness of approximately 3 mm. The pleated edge of the metal fiber fleece 18 is squeezed between two electrically and thermally insulated sides of the flanks as shown in FIG. 1. When mounted, the metal fiber fleece 18 is pressed in the fabric 30 over a depth 31 of approximately 1 mm. This recess avoids the blow-through of the metal fiber fleece once the filter element is in use.

To improve the resistance to the mechanical tension, due to the fixation of the different elements on top of each other by screw 16, several studs 35 may be welded to the upper and lower rim of each filter element. As shown in FIG. 1 and FIG. 2, around the filter element 11, a perforated metal plate 39 may be present (as only shown partially in the Figures for the sake of clarity).

Figure 4:
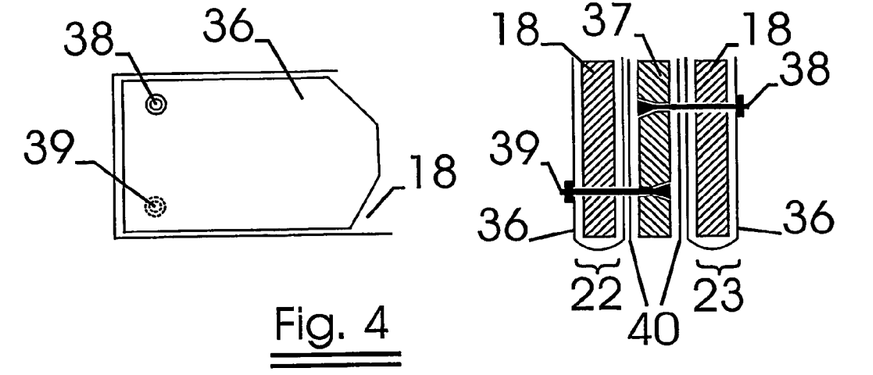
FIG. 4 shows schematically a side view of the contact bodies from a filter element as subject of the invention.
Figure 5:
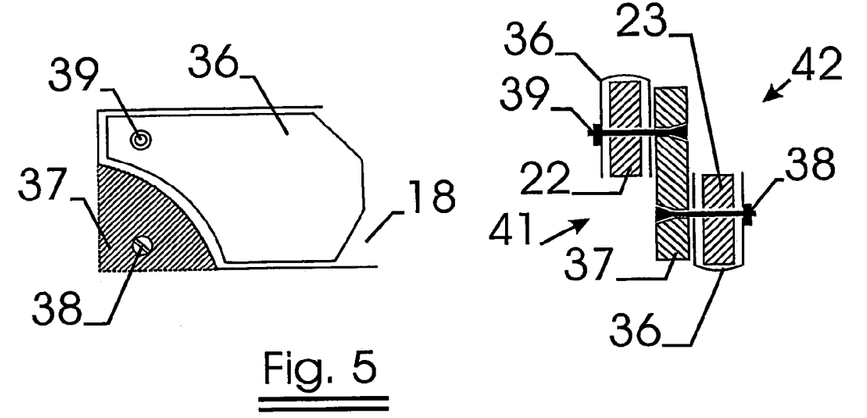
FIG. 5 shows schematically a view of alternative contact bodies from a filter element as subject of the invention.

Turning now to the contact bodies 22 and 23 of the preferred embodiment as shown in FIG. 4 and FIG. 5, a fine Ni-sheet 36 was sintered to the ends of the metal fiber fleece. Both contact bodies were brought together and fixed to an insulating plate 37, e.g. a mica-plate by means of two bolts 38 and 39. In order to avoid electrical contact between contact body 22 and bolt 38, and between contact body 23 and bolt 39, two mica sheets 40 were inserted between the insulating plate 37 and the contact bodies 22 and 23.

An alternative set-up is shown in FIG. 5. An identical set-up as in FIG. 4 is used, but the contact body 22 is shaped in such a way that no material of this contact body 22 is present at behind bolt 38, fixing the contact body 23 to the insulating plate 37. Identically, the contact body 23 is shaped in such a way that no material of this contact body 23 is present at behind bolt 39, fixing the contact body 22 to the insulating plate 37. Using such contact bodies, the use of two mica plates 40 may be avoided, which may simplify the construction of the filter element.

Figure 6:
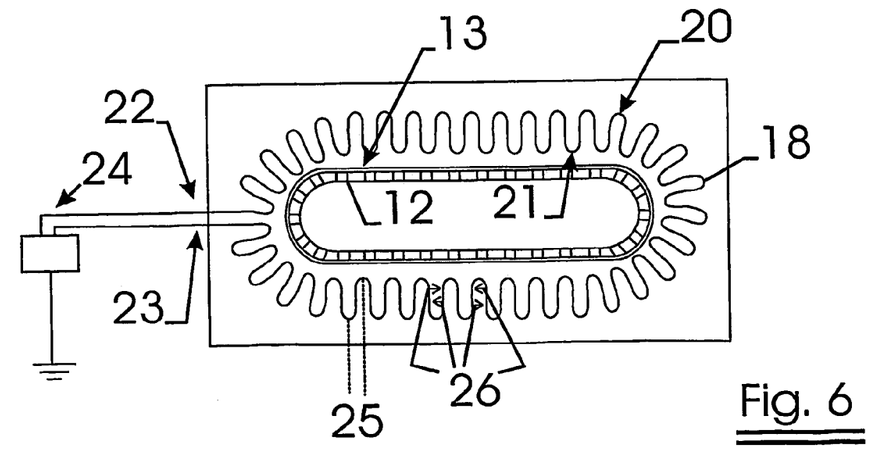
FIGS. 6, 7 and 8 show schematically a section according to the plane BB' of an alternative embodiment of a filter unit as subject of the invention.
Figure 7:
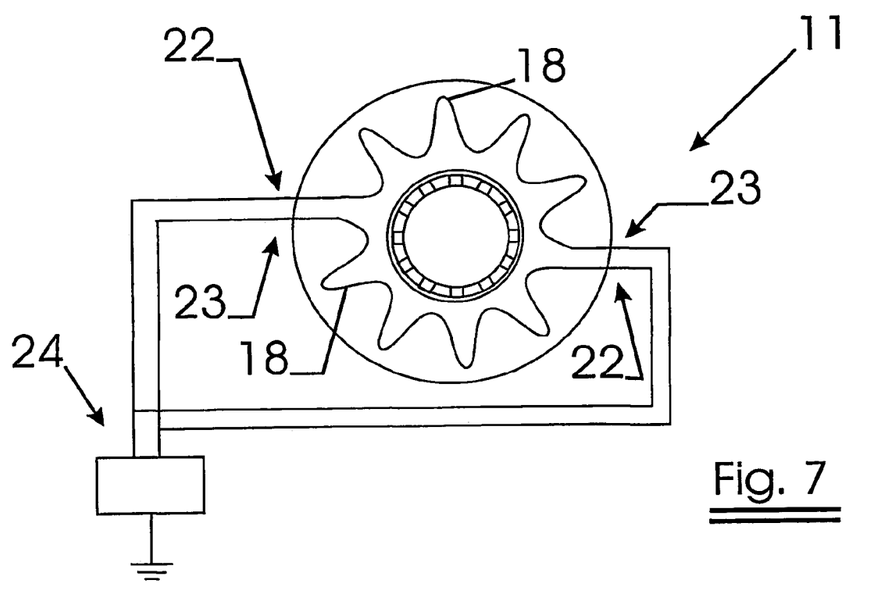

An alternative cut according to BB' is shown in FIG. 6. The perforated tube in this embodiment has an elliptic section. Also here, the metal fiber fleece is pleated according to pleating lines, which enables radiation from one pleat to another during regeneration. An other alternative cross section of a filter element as subject of the invention is shown in FIG. 7. The filter element in this embodiment comprises two metal fiber fleece strips, which together form the whole filter media of the filter element. Both metal fiber fleece strips have two contact bodies (22 and 23), at one end each, which are connected to an appropriate electric circuit 24.

Figure 8:
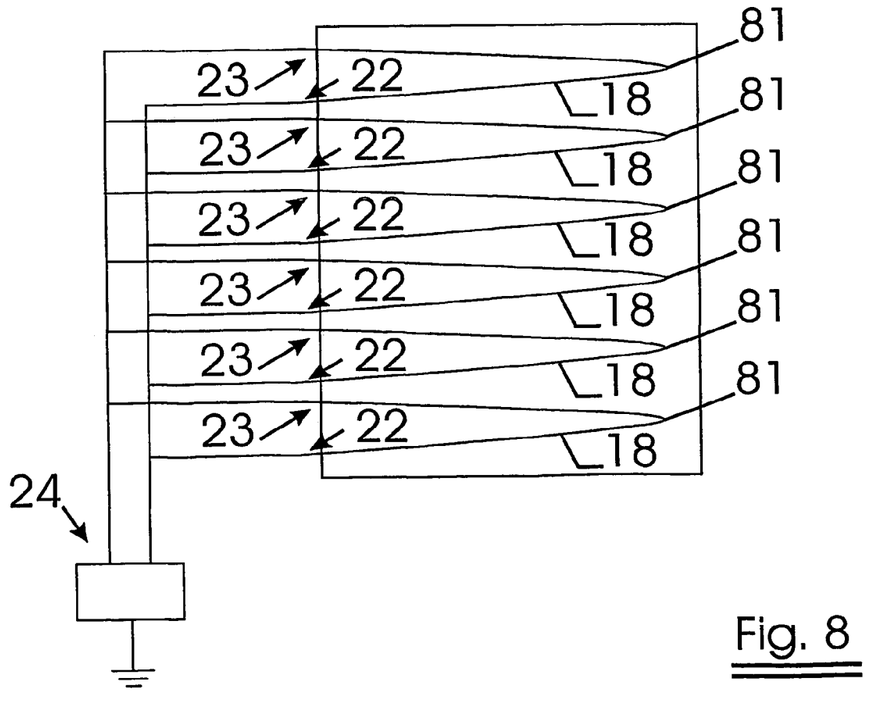

Another alternative cross section of a filter element as subject of the invention is shown in FIG. 8. The filter element comprises a set of metal fiber fleece strips, each being pleated over one pleating line 81. All strips are mounted side by side. Each metal fiber fleece strip has two contact bodies (22 and 23), one at each end of the strip. The contact bodies are lined up and connected to an appropriate electric circuit 24.

Figure 9:
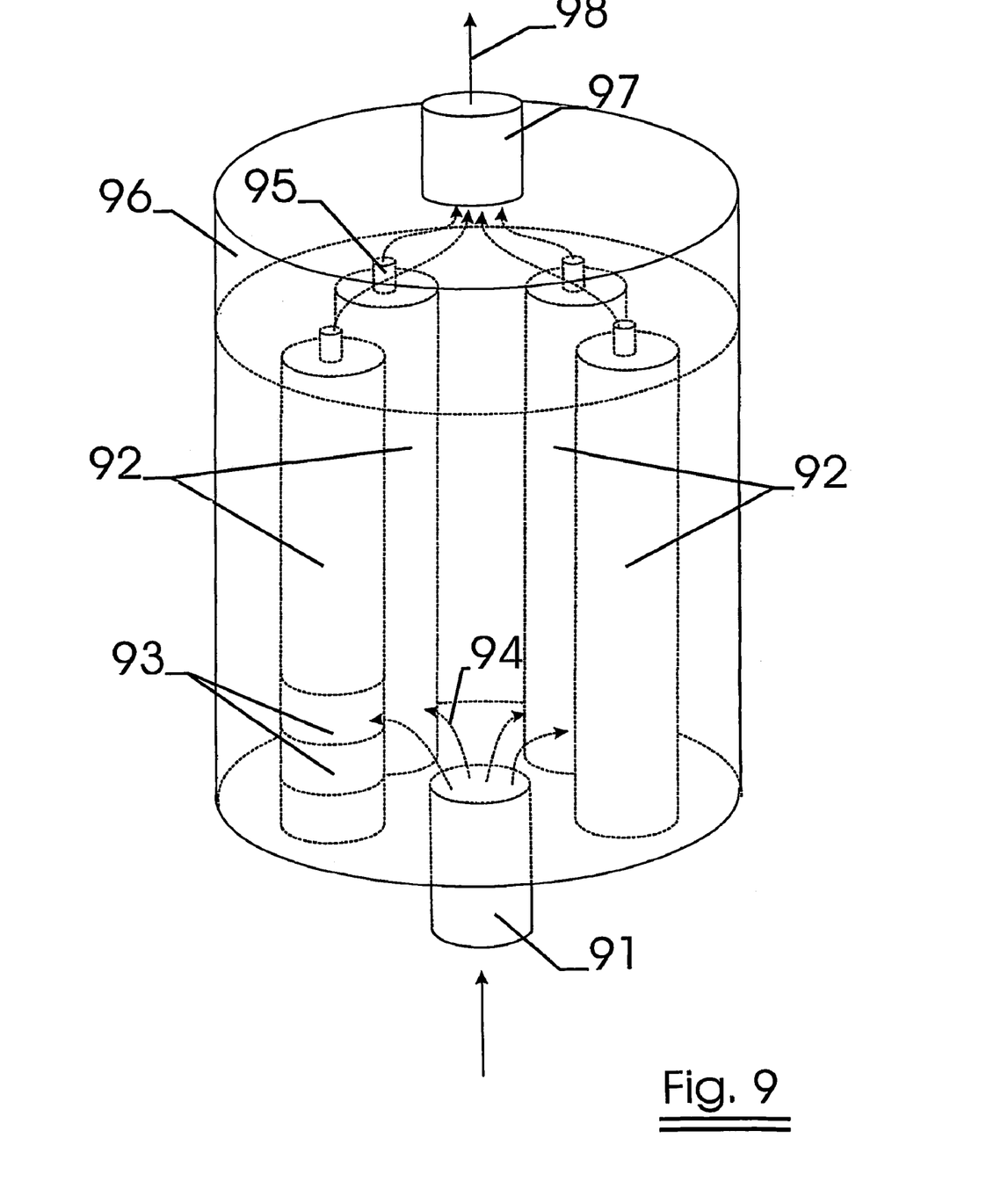
FIG. 9 shows a diesel exhaust filter system in a muffler-like shape, comprising different filter units as subject of the invention.

As shown in FIG. 9, gas to be filtered may enter into a muffler system as shown in the FIG. 9, via inlet 91. Several filter units 92, each comprising several filter elements 93 are present in the muffler-like system. The gas to be filtered goes, as indicated with arrow 94, through the filter media of each filter element and leaves the filter unit 92 via the perforated tube 95 in a collecting chamber 96. Via an outlet 97, the filtered exhaust gas flows further through the exhaust system as indicated with arrow 98.

As filter medium, a sintered metal fiber fleece comprising three layers of stainless steel fibers is used. A first layer comprises 600 g/m$^2$ of Fecralloy® fibers with equivalent diameter of 17 μm. A second layer of Fecralloy® fibers is applied on top of the first layer. This layer comprises 250 g/m$^2$ of fibers with equivalent diameter of 22 μm. A third layer of Fecralloy® fibers is applied on top of the second layer, having fibers with equivalent diameter of 35 μm. This third layer comprises 600 g/m$^2$ fibers.

A soot retention of 91% was obtained, using a stainless steel fleece, having a porosity of 85%.

The length of the metal fiber fleece in the above described embodiments is preferably 1200 mm, while the height of the metal fiber fleece strip is preferably between 30 and 35 mm, e.g. 33,75 mm.

The soot was so-called depth filtered. This is to be understood as the fact that soot particles were trapped through the whole depth of the filter.

Only 1 minute per element was needed to regenerate the filter unit, while consuming only 750W to 1500 W The pressure drop over the filter element was set to 100 mbar before regeneration.

What is claimed is:

1. A filter element comprising a pleated metal fiber fleece being pleated according to pleating lines, providing an edge with pleat openings to be closed to make gas flow through said metal fiber fleece, said filter element comprising at least two flanks wherein each of said flanks comprises a thermally and electrically insulating fabric and a stiff material layer, said thermally and electrically insulating fabric are present at one side of the stiff material layer, providing a thermally and electrically insulated side to said flank, said metal fiber fleece being mounted between the thermally and electrically insulated sides of both flanks, said flanks exercising a clamping force on said edges of said metal fiber fleece in a direction essentially parallel to said pleating lines, said flanks closing said pleat openings.

2. A filter element as in claim 1, said thermally and electrically insulating fabric being a ceramic textile fabric.

3. A filter element as in claim 1, said stiff material layer being a metal plate or metal rim.

4. A filter element as in claim 1, said thermally and electrically insulating fabric having a thickness of more than 3 mm, said thickness being less than 6 mm.

5. A filter element as in claim 1, wherein said clamping force provides a recess of said edge of said metal fiber fleece in said thermally and electrically insulating fabric, said recess having a depth of more than 0.5 mm, said depth being less than 2 mm.

6. A filter element as in claim 1, wherein said metal fiber fleece consists of stainless steel fibers.

7. A filter element as in claim 1, said metal fiber fleece being corrugated, with a corrugation comprising repetitive undulations having a wavelength of less than 5 times the thickness of said metal fiber fleece.

8. A filter element as in claim 1, said filter element comprising at least two contact bodies, said contact bodies being fixed to said metal fiber fleece.

9. A filter unit, comprising at least two filter elements as in claim 1, said filter elements being thermally insulated from each other.

10. Use of a filter element for filtering diesel exhaust gas, comprising the steps of
    providing a filter element as in claim 1 in an exhaust system for diesel exhaust gas; and
    allowing diesel exhaust gas to flow through the metal fiber fleece of the filter element for retention of soot particles out of said diesel exhaust gas.

11. Use of a filter unit for filtering diesel exhaust gas, comprising the steps of
    providing a filter unit as in claim 9 in an exhaust system for diesel exhaust gas; and
    allowing diesel exhaust gas to flow through the metal fiber fleece of the filter elements for retention of soot particles out of said diesel exhaust gas.

* * * * *